United States Patent [19]

Borzym

[11] 4,411,182
[45] Oct. 25, 1983

[54] BELT DRIVEN FLYING CUTOFF APPARATUS

[76] Inventor: John J. Borzym, 4820 Schoolbell, Birmingham, Mich. 48010

[21] Appl. No.: 258,230

[22] Filed: Apr. 27, 1981

[51] Int. Cl.³ .................. B23D 21/00; B23D 25/04
[52] U.S. Cl. ................................. 83/319; 83/320; 474/110
[58] Field of Search ............... 83/294, 295, 318, 319, 83/320; 474/110, 270

[56] References Cited

U.S. PATENT DOCUMENTS

| | | | |
|---|---|---|---|
| 2,213,992 | 9/1940 | Morse | 474/110 X |
| 2,293,260 | 8/1942 | Johnston | 83/319 X |
| 2,341,870 | 2/1944 | Johnston | 83/318 X |
| 2,907,450 | 10/1959 | Reid | 474/110 X |
| 3,072,009 | 1/1963 | Jenkins | 83/318 |
| 3,288,011 | 11/1966 | Borzym | 83/319 X |
| 3,323,637 | 6/1967 | Jenkins | 474/270 X |
| 3,354,765 | 11/1967 | Frey et al. | 83/318 X |
| 3,566,728 | 3/1971 | Ohmasu | 83/319 X |
| 3,628,450 | 12/1971 | Schmidt | 83/295 X |
| 3,735,673 | 5/1973 | Sheehan et al. | 83/319 X |
| 4,022,071 | 5/1977 | Abatemarco | 474/270 |
| 4,119,252 | 10/1978 | Bernard | 83/320 X |
| 4,312,252 | 1/1982 | Duddridge | 83/155 |

FOREIGN PATENT DOCUMENTS 1959425 6/1970 Fed. Rep. of Germany ........ 83/320

Primary Examiner—James M. Meister
Attorney, Agent, or Firm—Krass, Young & Schivley

[57] ABSTRACT

A flying cutoff for cutting successive lengths of a continuously moving, elongate workpiece includes a carriage assembly provided with a cutoff die set which is slideably mounted on a swinging ram and is selectively accelerated or decelerated in synchronism with the movement of the workpiece by a belt drive system which includes a plurality of endless, flexible, toothed belts, each secured to the carriage assembly and trained around a corresponding drive and idler gear. The belts are of different pitches and/or tensions so as to give the belts differing resonant and harmonic frequencies which tend to cancel each other out in order to eliminate cutting measurement error created by the cumulative effects of belt oscillation. The drive gears are driven by a hydraulic motor whose output is precisely controlled by a direct current, reversible stepping motor. Limit switches positioned at predetermined locations along the carriage path of travel provide signals to a computerized process controller which controls both the stepping motor and the ram in proper synchronization with the movement of the workpiece.

11 Claims, 2 Drawing Figures

BELT DRIVEN FLYING CUTOFF APPARATUS

TECHNICAL FIELD

The present invention generally relates to flying cutoff apparatus of the type employed to sever successive lengths of a continuously moving, elongate workpiece, and deals more particularly with a belt drive system for accelerating and decelerating a carriage assembly which is employed for clamping and cutting the workpiece on the fly.

BACKGROUND ART

Flying cutoff apparatus of the type in which a cutting tool moves in synchronization with a continuously moving workpiece is well known in the art. Typically, the cutting tool is mounted on a carriage which in turn is slideably supported on a base for movement in a direction aligned with the workpiece's path of travel. A so-called "accelerator" coupled with the carriage accelerates the carriage from a stationary starting position along the path of travel of the workpiece until the rate of travel of the carriage equals that of the workpiece itself. Depending upon the type of workpiece involved, means may be provided on the carriage for clamping the workpiece to the carriage to assure that the workpiece is held stationary relative to the carriage prior to the cutting operation. Immediately after the workpiece is severed, the accelerator decelerates the carriage and returns the same to its starting position, in preparation for the next severing operation. One type of known prior art accelerator consists of a hydraulically operated cylinder member whose reciprocating output shaft is connected to the carriage. The cylinder is of the double action type such that a first actuation thereof extends the output shaft to accelerate the carriage to the speed of the workpiece. Reverse actuation of the cylinder retracts the output shaft thereby returning the carriage to its starting position. Cylinder type accelerators are somewhat difficult to mount on conventional flying cutoff apparatus and may introduce cutting error because of the compressibility of the fluids used to drive such cylinders.

Another prior art accelerator consists of a rack and pinion gear arrangement in which a pinion drive powered by a motor shifts the rack which has the carriage secured thereon. This approach is undesirable, however, from the standpont that a relatively large motor and associated gearing are required to drive the heavy rack. This system is also relatively expensive due to the relatively large number of components, and is subject to introducing cutting length error when some of the components become worn over a period of use. Also, debris may become lodged in the mechanism which interferes with proper operation.

Accordingly, it is an important object of the present invention to provide an accelerator drive for a flying cutoff apparatus which is not only compact, simple in construction and therefore economical to manufacture, but is capable of controlling the cutoff lengths to highly accurate and repeatable dimensions.

A further object of the present invention is to provide an accelerator of the type described above in which those components subject to wear and deterioration over a period of extended use may be easily replaced with minimum cost.

A still further object of the present invention is to provide an accelerator of the type described above in which endless belts are employed for driving the carriage.

Another object of the invention is to provide a belt drive type accelerator of the type mentioned immediately above which eliminates the effect of resonance in the belts which otherwise contributes to cutting length error.

DISCLOSURE OF THE INVENTION

A flying cutoff machine employed for cutting successive lengths of a continuously moving, elongate workpiece, such as tubing emanating from a mill, includes a carriage assembly provided with a cutoff die set which is slideably mounted on the base of a swinging ram type press. The carriage is accelerated along the path of travel of the workpiece and the die set is clamped to the workpiece when the rate of travel of the carriage equals that of the workpiece. As the carriage and workpiece continue to travel in synchronism, the ram is operated to sever a length of the workpiece whereupon the die set is unclamped from the workpiece and the carriage is decelerated and returned to its starting position in preparation for the next cutting cycle. The carriage is accelerated by a belt drive system which includes a plurality of endless, longitudinally flexible belts each secured to the carriage assembly and trained around a drive and idler gear. The belts are of different widths, tensions and/or pitches in order to give them differing natural frequencies thereby to prevent resonance as periodic forces are applied to the belts during their use. The effects of the differing natural frequencies of the belts tend to cancel each other out thereby eliminating cutting measurement error created by the cumulative effects of belt resonance. The drive gears are driven by either a hydraulic or electric motor, or a combination thereof. Sensing devices monitor the rotational position of the motors output shaft and provide signals to a computerized process controller which controls the motor and the ram in proper synchronization with the movement of the workpiece. A measuring device senses the magnitude of linear displacement of the workpiece and provides digitally encoded data to the process controller for use in controlling the motor to precisely determine the cutoff length.

BRIEF DESCRIPTION OF THE DRAWINGS

In the drawings, which form an integral part of the specification and are to be read in conjunction therewith, and in which like components are designated by the same numerals in the various views.

BEST MODE FOR CARRYING OUT THE INVENTION

Figure 1:
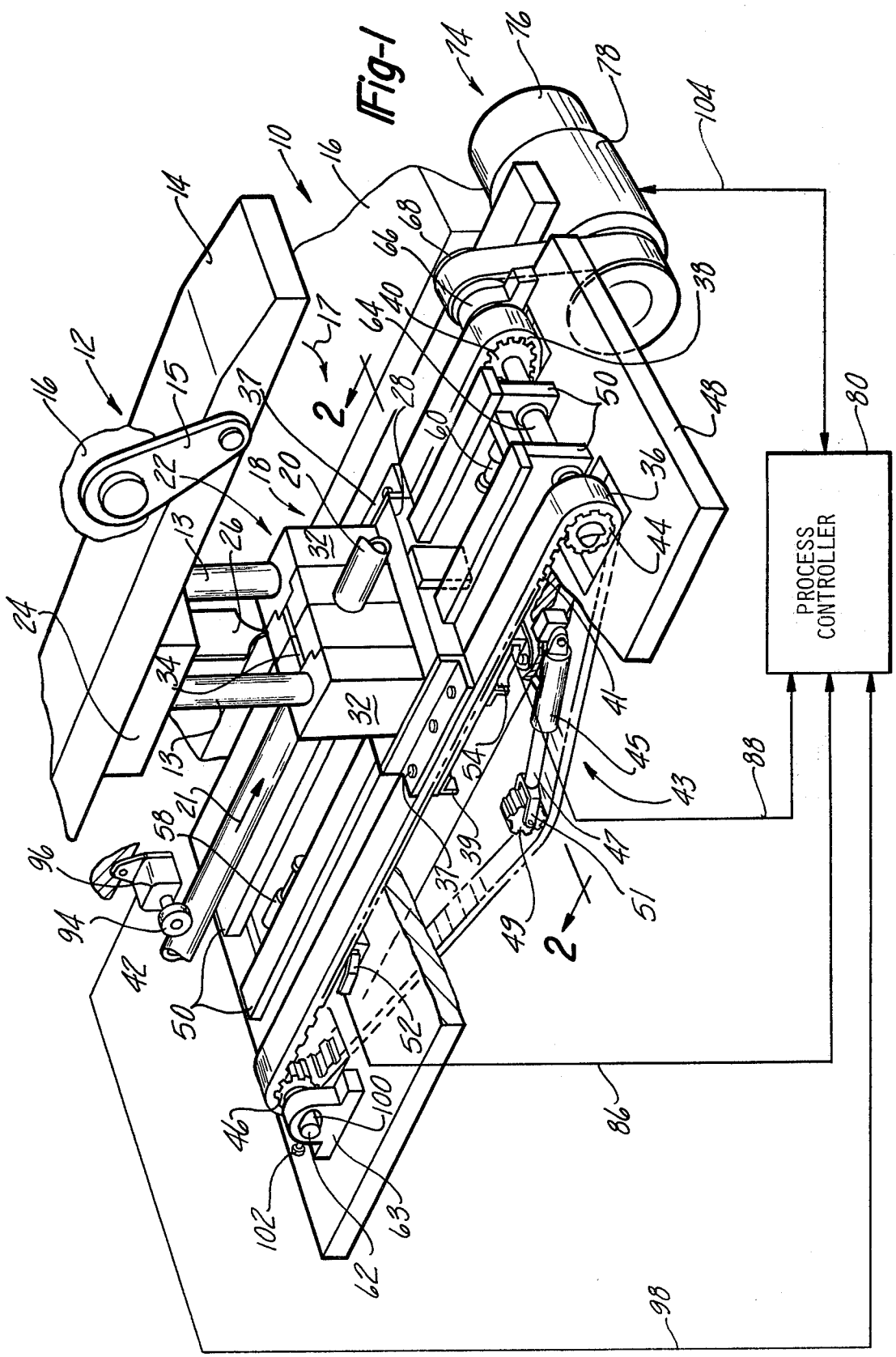
FIG. 1 is a combined perspective and block diagram view of a belt driven flying cutoff apparatus, showing the carriage during acceleration thereof, which forms the preferred embodiment of the present invention, parts being broken away for clarity; and, FIG. 2 is a sectional view taken along the line 2—2 in FIG. 1.
Figure 2:
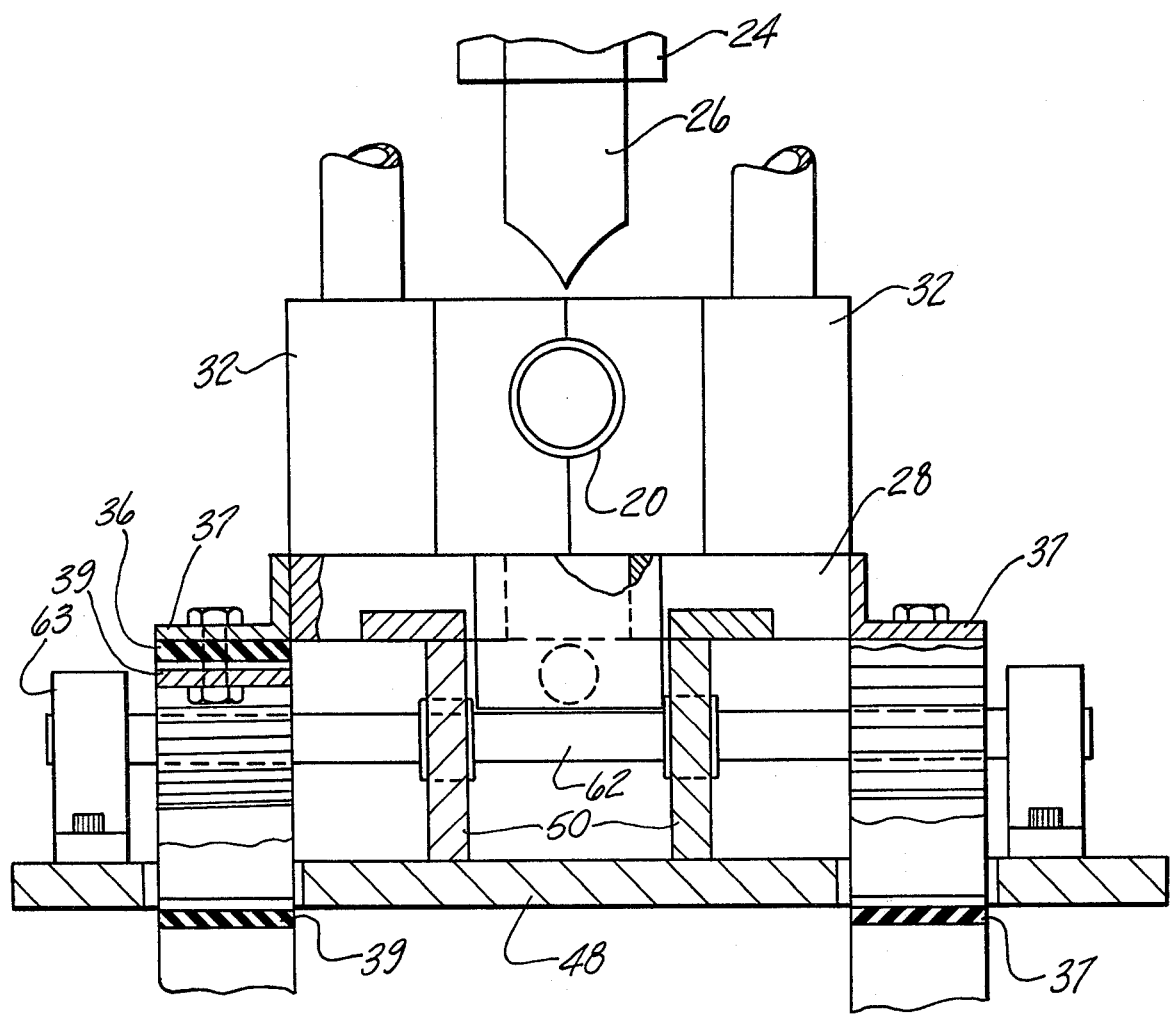

Referring to the drawings, a belt driven, flying cutoff apparatus generally indicated by the numeral 10 is adapted for use in cutting successive lengths of predetermined dimension of an elongate, continuously moving workpiece, herein shown as tubing 20, which continuously emanates from a source thereof (not shown) such as a mill in the direction of the arrow 21. The tubing 20 travels in a direction corresponding to its longitudinal axis toward a swingable type ram assembly 12 which comprises a ram 14 mounted by means of links 15 pivotally connected to a stationary base 16 for swinging movement in the direction of the arrow 17. The ram assembly 12 further includes a horizontally extending bed 48 beneath the ram 14. A pair of spaced apart, parallel guide ways 50 are secured to the upper face of bed 48 and extend parallel to the longitudinal axis of tubing 20.

A carriage assembly 18 is slideably supported on the guide ways 50 and includes a die set 22 which comprises an upper die shoe 24 and a lower die shoe 28 having slots therein for slideably receiving the guide ways 50. A pair of upright guide posts 13 mount the upper and lower die shoes 24 and 28 for vertical reciprocation relative to each other. A cutting blade 26 secured to the upper die shoe 24 is vertically reciprocable upon swinging of the ram 14. The die set 22 further includes a pair of opposed die jaws 32 slideably mounted for transverse reciprocating movement on the lower die shoe 28, each of the jaws 32 being provided with suitable cutouts therein for conformingly clamping the tubing 20 therebetween. The die jaws 32 include cutout portions in opposing faces thereof which form a vertically extending slot 34 in the die set 22 for receiving the cutting blade 26 therewithin.

Means for accelerating and decelerating the carriage assembly 18 on the guide ways 50 includes a pair of flexible, endless belt members 36 and 38 respectively disposed in transversely spaced apart relationship to each other, each of the belt members 36 and 38 being respectively secured to a bracket assembly comprising upper and lower portions 37 and 39 which are in turn secured to opposite sides of the lower die shoe 28. Belt member 36 is trained around a drive gear 44 and idler gear 46, while belt member 38 is trained around a drive roller 40 and idler roller 42. Idler gears 42 and 46 are respectively secured to idler shafts 62 which in turn are journalled for rotation on bearing blocks 63 secured to bed 48. Drive gears 40 and 44 are each secured to a common drive shaft 64, which is likewise journalled for rotation through the guide ways 50.

Each of the belt members 36 and 38 is of a gear belt type which includes a plurality of transversely extending ridges or teeth 41 which are adapted to meshingly engage the corresponding gears 40, 42, 44 and 46. Belt members 36 and 38 may be made from rubber or other resilient material which imparts some degree of flexibility therein, and preferably include rigid reinforcement material, as of metal, formed integral therewith to maximize their strength and durability. The pitch of gears 40 and 42 is different from that of gears 44 and 46, consequently, the pitch of teeth 41 of the belts 36 and 38 is correspondingly different. Additionally, the tension of belts 36 and 38 is preferably different for reasons which will be discussed later.

The tension on each of the belts 36 and 38 may be conveniently adjusted by means of a respectively associated tension adjustment device, one of same being generally indicated at 43. Each of the tension adjustment devices 43 comprises a fluid operated piston 45 which is secured to bed 48 and includes an extensible piston rod 47. A gear 49 is rotatably mounted by means of a clevis bracket 51 on the outer end of the rod 47 and meshingly engages the corresponding belts 36 and 38. A constraining link 53 secured between the piston 45 and bed 48 maintains the extension axis of the piston rod 47 at an inclined angle with respect to direction of travel of the carriage assembly 18. Piston 45 is preferably used in a combined hydraulic and pneumatic type control system (not shown) which is well known in the art and employs a source of pressurized hydraulic fluid such as oil and pressurized gas such as air. It may be readily appreciated that upon extension of rod 47, the gear 49 shifts downwardly against the corresponding belt 36 or 38 thereby increasing the belt tension. Moreover, the tension adjustment devices 43 also function to dampen oscillation and/or transient tension loads on the belts 36 and 38 by changing the natural frequencies of the belts 36, 38 relative to each other. Further, belt tension control is provided by means of a slot 100 in blocks 63 and an adjustment screw 102 which bears against and determines the position of the shaft 62 within slot 100.

One extremity of drive shaft 64 is rotatably mounted in a pillow bearing 66 which is secured on bed 48. A drive gear 68 secured on the end of drive shaft 64 is driven through a toothed drive belt 72 by a motor 74. Motor 74 may include a hydraulic type drive motor 78 whose input is controlled by a direct current, reversible, stepper motor 76 which in turn is controlled by a conventional process controller 80. The stepper motor 76 is precisely controllable using a series of digital pulses from the process controller 80. The output of the drive motor 78 accurately follows the output of stepper motor 76 but with a torque output which is several hundred times greater than that of motor 76.

The advantage of employing a hydraulic motor 78 is that such motors are capable of accelerating high inertia masses in minimum time intervals. This is because of the ability of hydraulic oil under pressure to have stiffness comparable with steel. However, it should be noted that a commercially available D.C. motor may be employed in lieu of the hydraulic combination described above.

A pair of hydraulic shock absorbers 58 and 60 are respectively mounted between the guide ways 50 on opposite extremities of each of the latter and are adapted to act as an impact absorbing cushion for contacting corresponding bumper plates 82 secured to opposite sides of lower die shoe 28. Shock absorbers 58 and 60 function to limit the movement of the carriage assembly 18 and assist in decelerating the same before its direction of travel is reversed. The relative position of the carriage assembly 18 along its length of travel may be continuously monitored for purposes of motor control by a conventional electro-optical device (not shown) which senses the rotational position of the output drive shaft of motor 74 and provides feedback signals via line 104 to the controller 80.

A pair of mechanically actuated electrical limit switches 52 and 54, respectively, are disposed at opposite ends along the path of travel of carriage assembly 18 and are each adapted to be contacted by the lower portion 39 of the bracket assembly. Limit switches 52 and 54 are each adapted to produce electrical output signals upon actuation thereof on the corresponding electrical lines 86 and 88 which are delivered to the process controller 80. As best seen in FIG. 1, limit switch 52 is disposed near the starting position or upstream end of the ram assembly 12 while limit switch 56 is positioned near the downstream thereof. Switches 52 and 54 are positioned beyond the normal limits of travel of the carriage assembly 18 and function as failsafe devices to disable the motor 74 in the event that the motor 74 drives the carriage assembly 18 beyond such limits.

Means for measuring the travel of tubing 20 includes a gage wheel 94 coupled with the input of a digital encoder 96 which is positioned on the upstream end of the cutoff apparatus 10. Encoder 96 is a conventional device which develops a digital code representative of the length of tubing 20 measured by the gage wheel 94. The electrical output of the encoder 96 is delivered by line 98 to the process controller 80.

Process controller 80 is a conventionally available item such as that manufactured by Motion Products of Minneapolis, Minnesota and identified by Series No. 470. The process controller 80 operates motor 74 in accordance with the information received from the electro-optical device mentioned previously, as well as the gage wheel 94 in order to provide the necessary control for cutting the tubing 20 on the fly with repeatable tolerances. Thus, the motor 74 is digitally controlled so that variations in the speed of the tubing 20 do not cause changes in the desired length dimension of the severed tubes because acceleration and velocity of the carriage assembly 18 are slaved to the rate of travel of the tubing 20.

Turning now to the operation of the apparatus 10, the length of the tubing 20 which is to be severed is preselected by setting the appropriate controls of the process controller 80. The cutting sequence is initiated with the carriage assembly 18 in a starting or home position toward the left as viewed in FIG. 1. The process controller 80 then activates motor 74 whose geared output turns drive shaft 64 and rollers 40 and 44 to produce linear movement of belt members 36 and 38. As belt members 36 and 38 move and rotate in a clockwise direction as viewed in FIG. 1, the carriage assembly 18 commences forward, from left to right. When the carriage assembly 18 reaches a preselected speed corresponding to that of the tubing 20, a signal is delivered on line 104 to the process controller 80 which in turn operates a motor (not shown) for driving the ram assembly 12. As the ram 14 begins to swingably descend, jaws 32 close on the tubing 20 and the cutting knife 26 severs the tubing 20 to the desired length before the carriage assembly engages and is decelerated by the shock absorber 60. After the severing operation is completed, upward swinging movement of ram 14 unclamps jaws 32 from the tubing 20 and the process controller 80 is operative to reverse motor 74 which causes return of the carriage assembly 18 to its starting position. On its return movement, the electro-optical sensor on the output shaft of motor 74 provides a feedback signal to the controller which is responsible to decelerate motor 74, and shock absorber 58 finally halts the movement of carriage assembly 18.

The belt members 36 and 38 are particularly satisfactory in achieving repeatable, precise cutting accuracy. It has been found that as a result of inertia in the drive system along with other contributing factors which result in the application of periodic forces on a drive belt member, such belt member tends to oscillate at resonant frequencies until the amplitude of such oscillation is sufficient to introduce cutting error, and even damage to certain components of the system. The present invention involves in part, recognition that resonance of the drive belt may be substantially eliminated by dividing such belt into a plurality of individual longitudinal segments, herein disclosed as belt members 36 and 38. By dividing up the drive belt into two or more longitudinal sections, it is possible to apply various tensions to the different segments and/or varying the pitches of the teeth of such belt sections. By making the drive belts 36 and 38 of different pitches and/or by applying different tensions thereto, the natural frequencies of such belt members are altered such that any resonant oscillations produced thereby are not cumulative, but rather tend to cancel each other out thereby eliminating the problem of excessive oscillation, and attendant cutting error.

From the foregoing, it is apparent that the belt driven flying cutoff apparatus disclosed herein not only provides for the reliable accomplishment of the object of the invention but does so in a particularly simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. Apparatus for use in cutting an elongate workpiece on the fly which is continuously moving along its longitudinal axis, comprising:
   a base;
   a carriage assembly mounted on said base for bidirectional movement along said longitudinal axis between a starting position and a finishing position;
   means mounted on said carriage assembly for cutting said workpiece; and,
   means for moving said carriage assembly on said base in synchronism with the movement of said workpiece, including
   (1) at least two flexible belt members fixedly secured to said carriage assembly and longitudinally extending essentially parallel to said longitudinal axis,
   (2) means for mounting said belt members for bidirectional movement essentially parallel to said longitudinal axis,
   (3) reversible drive means coupled with said mounting means for moving said belt members, whereby to move said carriage assembly from said starting position to said finishing position and from said finishing position back to said starting position, and
   (4) means for adjusting the natural frequency of at least one of said belt members relative to the other of said belt members in order to prevent resonance of said belt members.

2. The apparatus of claim 1, wherein said belt members are transversely spaced apart from each other.

3. The apparatus of claim 2, wherein each of said belt members is endless and includes drive teeth therein.

4. The apparatus of claim 3, wherein said mounting means includes at least two pairs of gear members, each of said belt members being associated with one of said pairs of gear members and trained therearound, the pitch of the teeth of one of said belt members being different than the pitch of the teeth of the other belt member.

5. The apparatus of claim 1, wherein at least certain of said belt members comprises a rubber material having metal reinforcement formed integral therewith, and further includes a plurality of aligned teeth elements.

6. The apparatus of claim 1, wherein said drive means comprises:

a direct current, electrically powered stepping motor having a controllable output, and a hydraulic motor having an input control and having an output drive drivingly coupled with said mounting means.

7. The apparatus of claim 1, further including:

a swingable ram assembly; and, means mounted on said ram assembly for cutting said workpiece.

8. The apparatus of claim 1, wherein said adjusting means includes means for adjusting the tension of each of said belt members.

9. The apparatus of claim 8, wherein said tension adjusting means includes a plurality of tension adjusting assemblies respectively associated with each of said belt members, each of said assemblies including means for engaging the corresponding belt member and fluid operated means for forcing said engaging means into engagement with said belt member.

10. The apparatus of claim 9, wherein said forcing means includes a fluid operated motor member.

11. Apparatus for use in cutting an elongate workpiece on the fly which is continuously moving along its longitudinal axis, comprising:

a base;

a carriage assembly mounted on said base for movement in a direction parallel to said longitudinal axis;

means carried by said carriage assembly for cutting said workpiece; and, means for moving said carriage assembly on said base in synchronism with the movement of said workpiece, including (1) elongate, flexible belt means secured to said carriage assembly, said belt means including a plurality of longitudinally extending, endless belt members having drive teeth therein, (2) means for mounting said belt means for movement parallel to said longitudinal axis, said mounting means including a plurality of pairs of gear members, each of said plurality of belt members being associated with one of said plurality of gear members and trained therearound, the pitch of the teeth of certain of said belt members being different than the pitch of the teeth of the remaining belt members, and (3) drive means coupled with said mounting means for moving said belt means.

* * * * *